May 28, 1940.  L. F. POOCK  2,202,428
MACHINE TOOL
Filed June 29, 1939
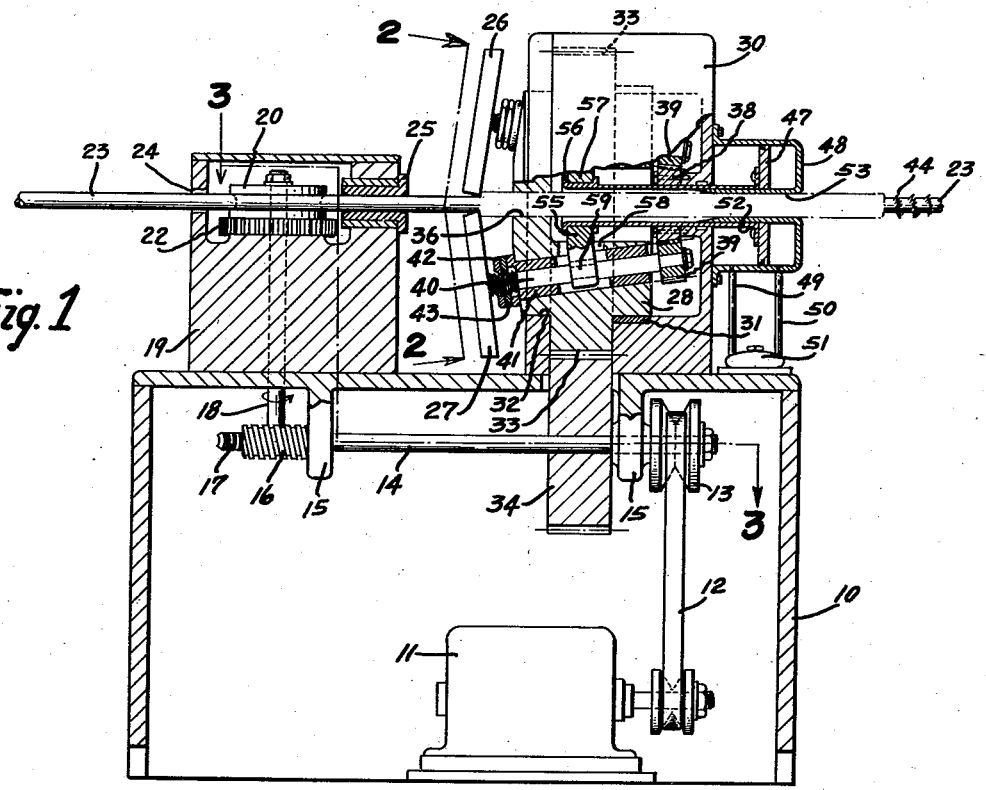
Fig. 1
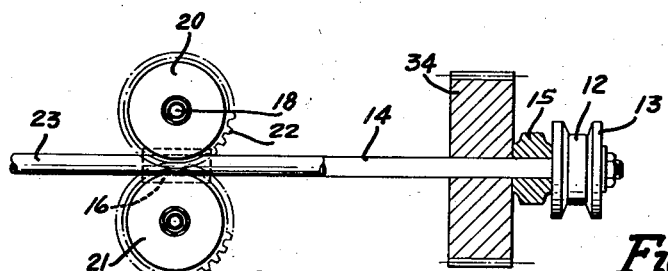
Fig. 3
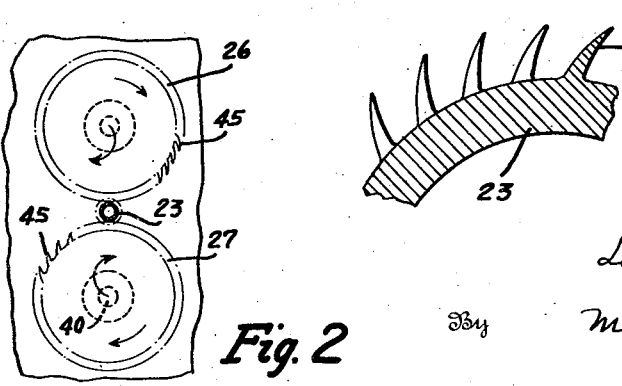
Fig. 2
Fig. 4
Inventor
Louis F. Poock
By Maréchal & Noë
Attorney Patented May 28, 1940

2,202,428

UNITED STATES PATENT OFFICE 2,202,428

MACHINE TOOL

Louis F. Poock, Dayton, Ohio, assignor to The Cimatool Company, Dayton, Ohio, a corporation of Ohio Application June 29, 1939, Serial No. 281,788

6 Claims. (Cl. 29—1)

This invention relates to machine tools and more particularly to machines for producing fins on an elongated work piece.

One object of the invention is the provision of a machine adapted to produce fins or spines on an elongated work piece, the machine having provision for readily moving the cutting means out of engagement with the work either during the continued feeding movement of the work or while work is stopped.

Another object of the invention is the provision of a machine of the character mentioned embodying a cutter which is rotatable about an axis inclined to the longitudinal axis of the work piece and which is adapted to rotate on its own axis and to be rotated bodily about the longitudinal axis of the work piece during the feeding movements of the work piece.

Another object of the invention is the provision of a machine adapted to produce fins on an elongated work piece and embodying a plurality of rotatable cutters which operate in timed relation with the work feeding mechanism, the cutters being rotatably mounted on a rotatable cutter head on axes which have a fixed inclination to the axis of the work piece and adapted for simultaneous movement in the direction of their own axes for disengagement with the work during the continued operation of the feeding mechanism or during stoppage of feeding mechanism.

Other objects and advantages of the invention will be apparent from the following description, the appended claims, and the accompanying drawing in which a preferred embodiment of the invention has been shown.

In the drawing:

Fig. 1 is a side elevation of the machine, some of the parts being shown in vertical section;

Fig. 2 is a section on the line 2—2 of Fig. 1;

Fig. 3 is a plan view of the feeding mechanism, as viewed on line 3—3 of Fig. 1; and Fig. 4 is an enlarged sectional view of a fragment of the finned tube.

Referring more particularly to the drawing by reference numerals 10 designates the base of a machine adapted to produce fins on an elongated work piece. The work piece may be a hollow tube of copper, steel, or other suitable material, and the machine is such as to cut and strike out the surface portions of the tube to provide a series of spurs or fins which are especially useful in increasing the heat transfer effect of the tube when used as a thermal transfer unit, a radiator in a refrigeration system, or the like. In the formation of a finned tube, where the tube is to be subsequently bent at different places along its length, those places where the bends are to be made should not be finned, and the machine of the present invention permits the convenient movement of the cutters into and out of effective cutting positions during the continued feeding movement of the tube through the machine so that spaces of suitable length may be left unfinned as desired.

The base 10 forms a support for an electric motor 11 which is connected through drive belt 12 to a pulley 13 fixed on a shaft 14 which is suitably journalled in bearing supports 15. On the shaft 14 is a worm 16 engaging a worm wheel 17 which is carried by a vertical shaft 18. The shaft 18 is rotatably mounted in a suitable supporting block 19 and carries a grooved feed roller 20 at its upper end. A cooperating feed roller 21 is rotatably supported at one side of the roller 20, the two rollers 20 and 21 being interconnected by spur gears 22 and 22a which mesh with one another and provide timed movement of the two rollers which are suitably spaced apart to grip the elongated work piece or tube 23. The tube 23 is supplied through an opening 24 in the block 19 and will be carried along at a controlled rate through a guide bushing 25 towards the rotatable cutting means.

As herein shown there are two simultaneously acting cutters 26 and 27 of similar construction, arranged at opposite sides of the longitudinal axis of the work piece. Each is provided with a series of cutting edges 45 acting successively to cut or slice the surface of the work piece leaving one end of such cut portion connected, and bending or turning the cut portion outwardly as the cutting proceeds, to provide fins or spurs integral with the work piece. The cutters are rotatably carried in a cutter head 28 for movement about their own axes which are inclined to the axis of the work piece, as will be apparent from Fig. 1 of the drawing. Cutter head 28 is rotatably mounted in the stationary housing member 30, being rotatably supported on bearing surfaces 31 and 32. The body portion of the cutter head is formed to provide gear teeth 33 which mesh with the drive gear 34 carried by shaft 14 so that the cutter head will be rotated in timed relation with the feeding movement of the work piece, the axis of rotation of the cutter head coinciding with the longitudinal axis of the work piece. A passage 36 in the cutter head receives the finned work piece, which emerges in finished condition from the right-hand end of the housing 30.

As the cutter head rotates about its own axis, the cutters 26 and 27 are rotated on their own axes in the cutter head by means of a stationary gear 38 fixed in the housing 30 and meshing with a gear 39 on each cutter shaft. Each gear 39 is provided with straight spur teeth. The shaft 40 which carries the cutter 27 is arranged in a sleeve 41 which is secured in the cutter head and which supports the shaft 40 for rotational and for axial sliding movement therein. The cutter 27 is fixed on the end of the shaft 40 and is preferably provided with a threaded portion which receives a pair of lock nuts 42 and 43, the nut 43 abutting against the outer end of the bushing 41 and serving to limit the movement of the cutter toward the work. As will be apparent, the two lock nuts may be adjusted along the threaded portion of the shaft to provide an adjustment for the normal operating position of the cutter. The drive and support for the cutter 26 is of similar construction, both cutters operating on the work piece at opposite sides thereof at the same time to provide fins or projections 44, shown on an enlarged scale in Fig. 4.

Suitable means are provided for holding the cutters in working position, with the lock nuts bearing against the ends of the bushings in the cutter head, and for also moving the cutters in the direction of their own axes at any time. They can thus be withdrawn from engagement with the work while the tube is being fed through the machine so that a desired length of tube can pass along without being finned. When a suitable length of the tube has passed the cutters without being finned, the cutters may be simultaneously moved in the direction of their own axes, towards the right as viewed in Fig. 1, to return the cutters into engagement with the work. The cutters may also be moved axially while the feeding means is stopped.

The means for operating the cutters in the direction of their axes, as shown, comprises a fluid pressure control including an annular piston 47 operating in a cylinder 48 which is bolted to the end of the fixed housing 30. Fluid pressure may be supplied from a suitable source through either of the supply passages 49 and 50 by operating the fluid pressure control valve 51 which is under the manual control of the operator. When fluid is supplied to the right-hand side of the piston, the piston is moved to the left and the cutter shafts are moved in the direction of their own axes, thus moving the centers of the cutters away from the center of the work piece and disengaging the cutters from the work. As shown, the piston 47 is connected to the operating tube 52 which fits for sliding movement on the inner wall 53 of the fluid pressure cylinder, the wall 53 serving as a guide means for the finned work. The tube 52 projects past the gear 38 and is provided with spaced flanges 56.

Rotatably carried by tube 52 between the flanges is the hub portion 57 of an operating member having arms 55, one for each of the cutter shafts. The operating arm 55 which is shown in Fig. 1 projects through the passage 58 extending radially in the cutter head and is provided with a bifurcated jaw 59 which straddles a cylindrical portion of the shaft 40 of somewhat smaller diameter than the adjacent portions of the shaft so that as the arm 55 is moved axially of the cutter head, it moves the shaft 40 a proportionate amount in the direction of the axis of the shaft 40. The shaft of the other cutter is operated the same amount at the same time. A limiting position of the cutter shafts, with the cutters retracted from the work, is provided when the end of the tube 52 engages against the adjacent surface of the cutter head, the angularity of the axis of the cutter shafts with respect to the longitudinal axis of the work being sufficient so that the cutters are entirely removed from engagement with the work when this limiting position obtains.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine of the character described for producing fins on an elongated work piece comprising feeding mechanism for advancing the work piece in the direction of its length, a cutter head in line with the longitudinal axis of the work piece and having a passage through which the work piece extends, cutters rotatably carried by said cutter head for rotation about axes having an angular inclination to the axis of the work piece, means for rotating the cutter head about the axis of the work piece and for rotating the cutters about their own axes in timed relation, and means operable to simultaneously move said cutters in the direction of their own axes.

2. A machine of the character described for producing fins on an elongated work piece comprising feeding mechanism for advancing the work piece in the direction of its longitudinal axis, a cutter head in line with the work piece and having a passage through which the work piece extends, cutters rotatably carried by said cutter head for rotation about axes having a fixed angle of inclination to the axis of the work piece, drive means for rotating the cutter head about the axis of the work piece and for rotating the cutters about their own axes, a common drive member for said feeding mechanism and for said drive means, and means operable to simultaneously move said cutters in the direction of their own axes during continued operation of said drive means and feeding mechanism.

3. A machine of the character described for producing fins on a tube comprising feeding mechanism for advancing the tube in the direction of its length, a cutter head in line with the tube and having a passage through which the tube extends, a cutter rotatably carried by said head for rotation about an axis inclined angularly to the tube axis, means for rotating the cutter head about the tube axis, a gear rotatable with said cutter, a stationary gear meshing with said gear for rotating the cutter about its own axis as the cutter head rotates, and means operable to move said cutter in the direction of its own axis.

4. A machine of the character described for producing fins on an elongated work piece comprising feeding mechanism for advancing the work piece in the direction of its longitudinal axis, a cutter head in line with the work piece, means rotatably supporting said cutter head, a cutter rotatably carried by said cutter head for rotation about an axis having a fixed angle of inclination to the axis of the work piece, drive means for rotating the cutter head about the axis of the work piece and for rotating the cutter about its own axis, a common drive member for said feeding mechanism and for said drive means, and means operable to move said cutter in the direction of its own axis during continued operation of said drive means and feeding mechanism.

5. A machine of the character described for producing fins on an elongated work piece comprising feeding mechanism for advancing the work piece in the direction of its length, a cutter head in line with the longitudinal axis of the work piece and having a passage through which the work piece extends, a pair of cutters rotatably carried by said cutter head at opposite sides of the work piece for rotation about axes having a fixed angular inclination to the axis of the work piece, means for rotating the cutter head about the axis of the work piece, gear means for rotating the cutters about their own axes as the cutter head rotates, and means operable to simultaneously move said cutters in the direction of their own axes to move the cutters to and from engagement with the work.

6. A machine of the character described for producing fins on a tube comprising feeding mechanism for advancing the tube in the direction of its length, a cutter head in line with the tube and having a passage through which the tube extends, cutter shafts rotatably carried by said head for rotation about axes inclined at a predetermined angle to the tube axis, means for rotating the cutter head about the tube axis, a cutter on each of said shafts each cutter having an annular series of edged cutting blades, a gear rotatable with each of said shafts, a stationary gear meshing with said gears for rotating the cutter shafts about their own axes as the cutter head rotates, means for independently adjusting each of said cutters axially on its respective shaft, and means operable to simultaneously move said cutters in the direction of their own axes to move the cutters to and from the work.

LOUIS F. POOCK.